(12) United States Patent
Liu (10) Patent No.: US 8,356,794 B1
(45) Date of Patent: Jan. 22, 2013

(54) QUICK RELEASE CONNECTOR

(76) Inventor: Hsiu-Hsiung Liu, New Taipei (TW)

( * ) Notice: Subject to any disclaimer, the term of this patent is extended or adjusted under 35 U.S.C. 154(b) by 0 days.

(21) Appl. No.: 13/208,372

(22) Filed: Aug. 12, 2011

(51) Int. Cl.
*F16L 37/28* (2006.01)

(52) U.S. Cl. .................................. 251/149.9; 251/149.6

(58) Field of Classification Search ............... 251/149.6, 251/149.8, 149.1, 149, 149.9; 137/614.05, 137/614.06
See application file for complete search history.

(56) References Cited

U.S. PATENT DOCUMENTS

| | | | | |
|---|---|---|---|---|
| 2,255,333 A | * | 9/1941 | Scheiwer | 251/149.6 |
| 2,459,477 A | * | 1/1949 | Van Schuyver | 251/149.6 |
| 3,378,225 A | * | 4/1968 | Snyder, Jr. | 251/149.6 |
| 4,546,956 A | * | 10/1985 | Moberg | 251/149.6 |
| 5,240,023 A | * | 8/1993 | Shelef et al. | 251/149.6 |
| 5,607,139 A | * | 3/1997 | Kjellberg | 251/149.6 |
| 6,129,334 A | * | 10/2000 | Kuwabara | 251/149.6 |
| 6,279,874 B1 | * | 8/2001 | Nyberg | 251/149.6 |
| 6,886,803 B2 | * | 5/2005 | Mikiya et al. | 251/149.6 |
| 7,926,783 B1 | * | 4/2011 | Liu | 251/149.6 |
| 8,196,606 B2 | * | 6/2012 | Kitagawa | 251/149.6 |

* cited by examiner

*Primary Examiner* — John Bastiasnelli
*Assistant Examiner* — Andrew J Rost
(74) *Attorney, Agent, or Firm* — Pai Patent & Trademark Law Firm; Chao-Chang David Pai (57) ABSTRACT

A quick release connector has a body, a positioning mount, a sealing valve and an outer sleeve. The body is hollow and has a threaded end, a connecting end, an air inlet chamber, a mounting recess, a threaded segment, a sealing ring and a pressing ring. The positioning mount is detachably connected to the body and has a fixing end, an inserting end, an air outlet chamber, a returning spring, multiple ball holes and multiple balls. The sealing valve is movably mounted between the body and the positioning mount, selectively abuts the sealing ring of the body and has a closed end, an open end and at lease one air inlet. The outer sleeve is slidably mounted between the body and the positioning mount and has a mounting end, a pushing end, an internal surface, a spring recess, a holding recess and a pressing spring.

10 Claims, 9 Drawing Sheets

QUICK RELEASE CONNECTOR

BACKGROUND OF THE INVENTION

1. Field of the Invention

The present invention relates to a connector, and more particularly to a quick release connector that can reduce the cost of production and can be used safely and maintained easily.

2. Description of Related Art

A conventional quick release connector is used in pipe connections and comprises a body, a sealing valve and an outer sleeve. The body is hollow and has an external surface, an air inlet chamber, a mounting recess, an air outlet chamber, a returning spring, multiple ball holes, multiple balls, a limiting groove, a sealing ring, a washer, multiple holding pins and a limiting ring. The inlet chamber, the mounting recess and the outlet chamber are continuously formed in the body and communicate with each other. The returning spring is mounted in the air inlet chamber. The ball holes are formed through the external surface of the body at intervals and communicate with the air outlet chamber. The balls are respectively held in the ball holes in the body.

The limiting groove is formed around the external surface of the body near the air outlet chamber. The sealing ring is mounted in the mounting recess. The washer is mounted in the mounting recess and abuts between the sealing ring and the returning spring. The holding pins are securely and transversally mounted in the air outlet chamber to hold the washer and the sealing ring securely in the mounting recess. The limiting ring is mounted in the limiting groove of the body.

The sealing valve is movably mounted in the body and has an external surface abutting against the balls and at least one air inlet communicating with the air inlet chamber of the body. The returning spring is mounted around the sealing valve. The outer sleeve is slidably mounted around the body and has two ends, a spring recess, an abutting recess, a holding recess and a pressing spring. The spring recess is formed in the outer sleeve at one of the ends of the outer sleeve and is mounted around the body. The abutting recess is formed in the outer sleeve at the other end and has a bottom selectively abutting the limiting ring of the body to keep the outer sleeve from escaping from the body. The holding recess is formed in the outer sleeve near the abutting recess and holds the balls inside. The pressing spring is mounted around the body in the spring recess and abuts the external surface of the body to make the balls hold between the holding recess, the ball holes and the external surface of the sealing valve.

In production, the conventional quick release connector needs to use the holding pins to hold the sealing ring and the washer to mount securely in the mounting recess of the body. In addition, the conventional quick release connector needs to form the limiting groove around the external surface of the body and to mount the limiting ring in the limiting groove to prevent the outer sleeve from escaping from the body and to hold the balls between the outer sleeve and the sealing valve. However, the holding pins, the limiting groove and the limiting ring will increase the cost and time of producing and maintaining the conventional quick release connector.

Additionally, the sealing ring and the washer are held in the mounting recess of the body only by the holding pins and the pressured air of an air compressor may leak from the body and cause danger in operation. Furthermore, the balls are held between the outer sleeve and the sealing valve only by the limiting ring, the holding force provided by the limiting ring is restricted and the balls may escape out of the outer sleeve and the sealing valve when the conventional quick release connector falls downward from a high location.

The quick release connector in accordance with the present invention mitigates or obviates the aforementioned problems.

SUMMARY OF THE INVENTION

The main objective of the invention is to provide a quick release connector that can reduce the cost of production, can be used safely and maintained easily.

The quick release connector in accordance with the present invention has a body, a positioning mount, a sealing valve and an outer sleeve. The body is hollow and has a threaded end, a connecting end, an air inlet chamber, a mounting recess, a threaded segment, a sealing ring and a pressing ring. The positioning mount is detachably connected to the body and has a fixing end, an inserting end, an air outlet chamber, a returning spring, multiple ball holes and multiple balls. The sealing valve is movably mounted between the body and the positioning mount, selectively abuts the sealing ring of the body and has a closed end, an open end and at lease one air inlet. The outer sleeve is slidably mounted between the body and the positioning mount and has a mounting end, a pushing end, an internal surface, a spring recess, a holding recess and a pressing spring.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a quick release connector (US standards M-type) in accordance with the present invention comprises a body 10, a positioning mount 20, a sealing valve 30 and an outer sleeve 40.

Figure 1:
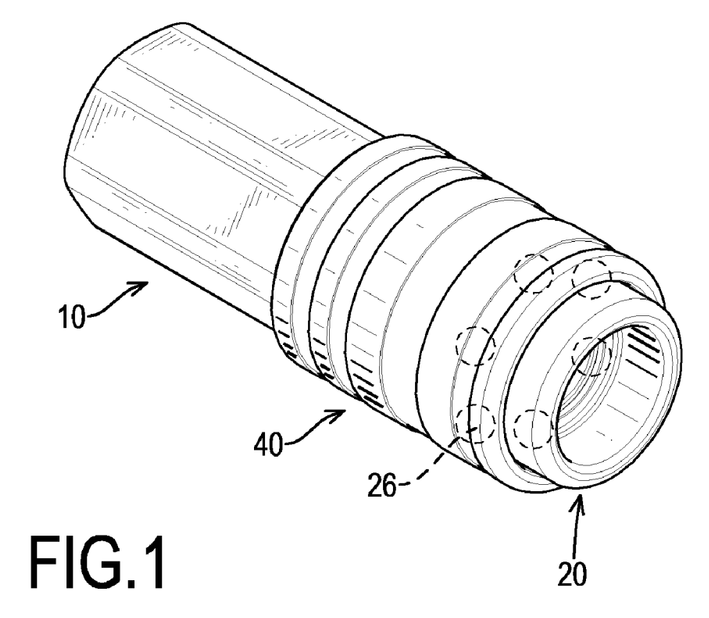
FIG. 1 is a perspective view of a first embodiment of a quick release connector in accordance with the present invention.
Figure 2:
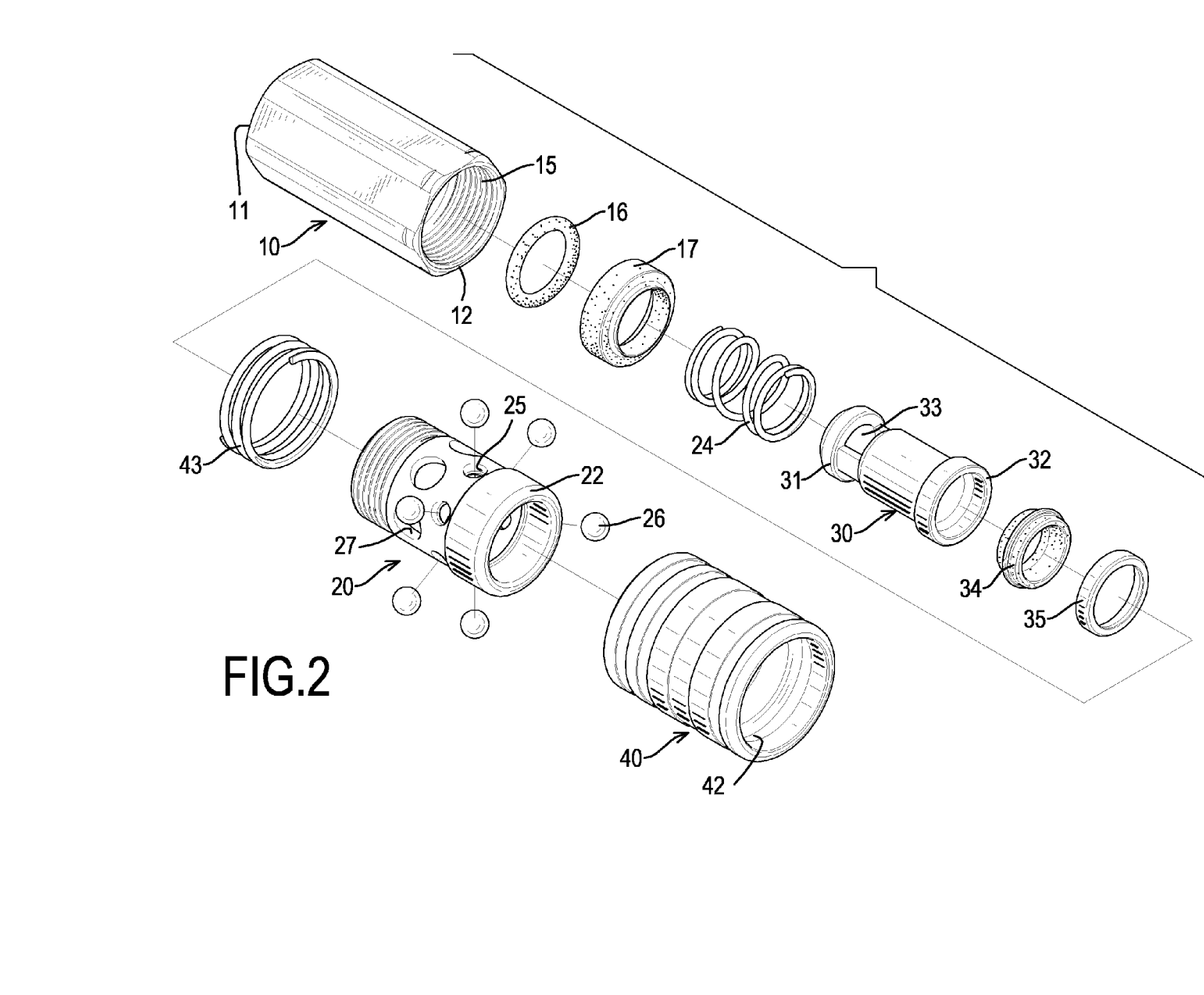
FIG. 2 is an exploded perspective view of the quick release connector in FIG. 1.
Figure 3:
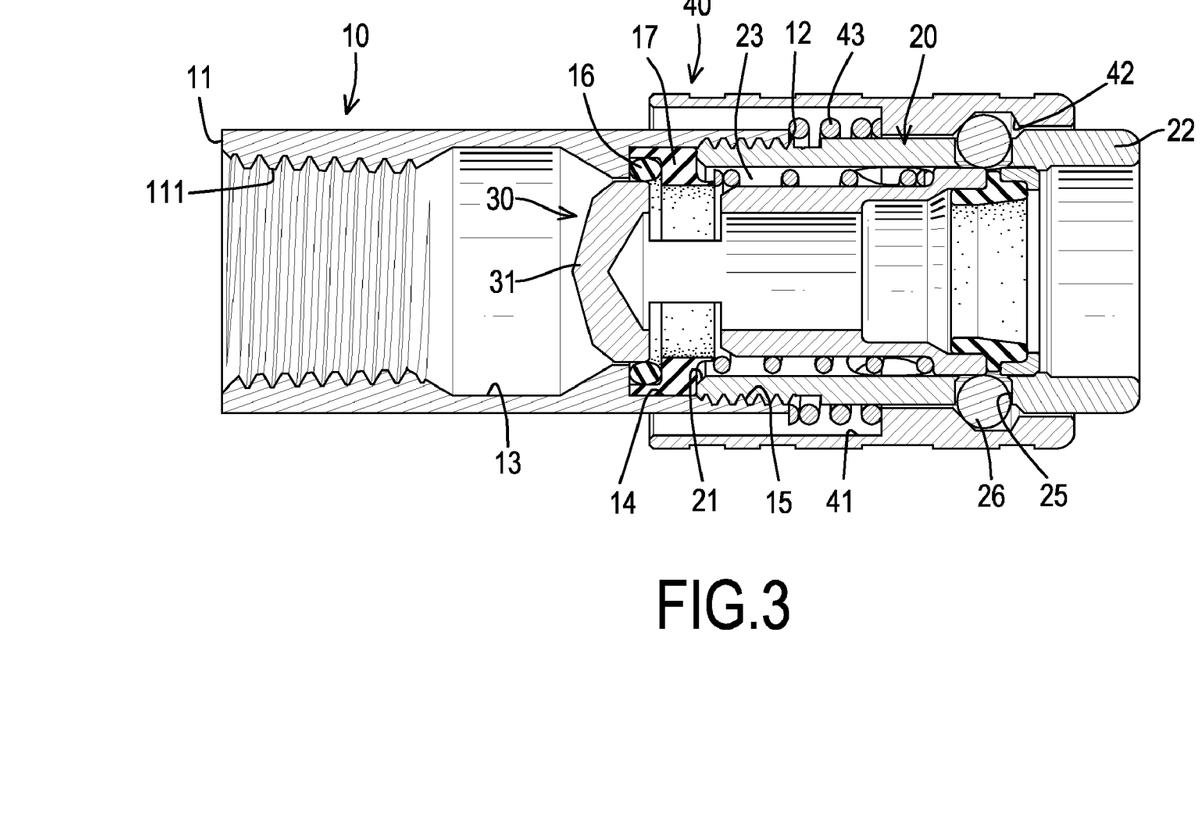
FIG. 3 is a cross sectional side view of the quick release connector in FIG. 1.
Figure 9A:
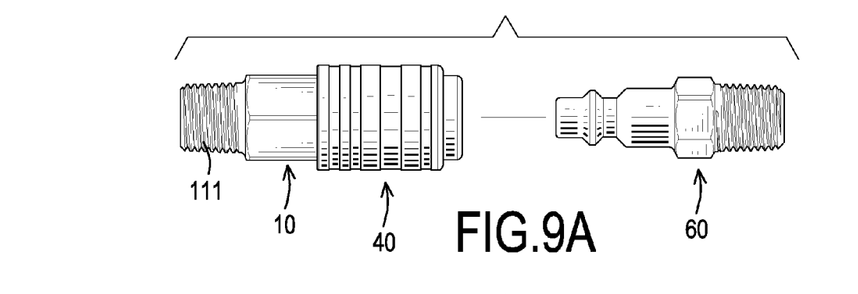
FIG. 9A is another operational side view of a third embodiment of a quick release connector in accordance with the present invention showing another plug being inserted into the connector.

The body 10 is hollow and has an external surface, an internal surface, a threaded end 11, a connecting end 12, an air inlet chamber 13, a mounting recess 14, a threaded segment 15, a sealing ring 16 and a pressing ring 17. The threaded end 11 of the body 10 is connected to an air compressor and has a thread 111. With reference to FIGS. 3 and 9A, the thread 111 is formed in the internal surface of the body 10 at the threaded end 11 or is formed on the external surface of the body 10 at the threaded end 11. The connecting end 12 of the body 10 is formed with the threaded end 11 of the body 10. The air inlet chamber 13 is formed in the body 10 near the threaded end 11, communicates with the air compressor with a pipe or the like or directly and has a diameter.

The mounting recess 14 is formed in the body 10, communicates with the air inlet chamber 13 and has an internal surface, a protruding face and a diameter smaller than the diameter of the air inlet chamber 13. The protruding face is formed on the internal surface of body 10 at the mounting recess 14 near the air inlet chamber 13. The threaded segment 15 is formed in the body 10 near the connecting end 12 and communicates with the mounting recess 14 and the air inlet chamber 13. The sealing ring 16 is mounted in the mounting recess 14 of the body 10 and abuts against the protruding face of the mounting recess 14. The pressing ring 17 is mounted in the mounting recess 14 and abuts the sealing ring 16.

Figure 6:
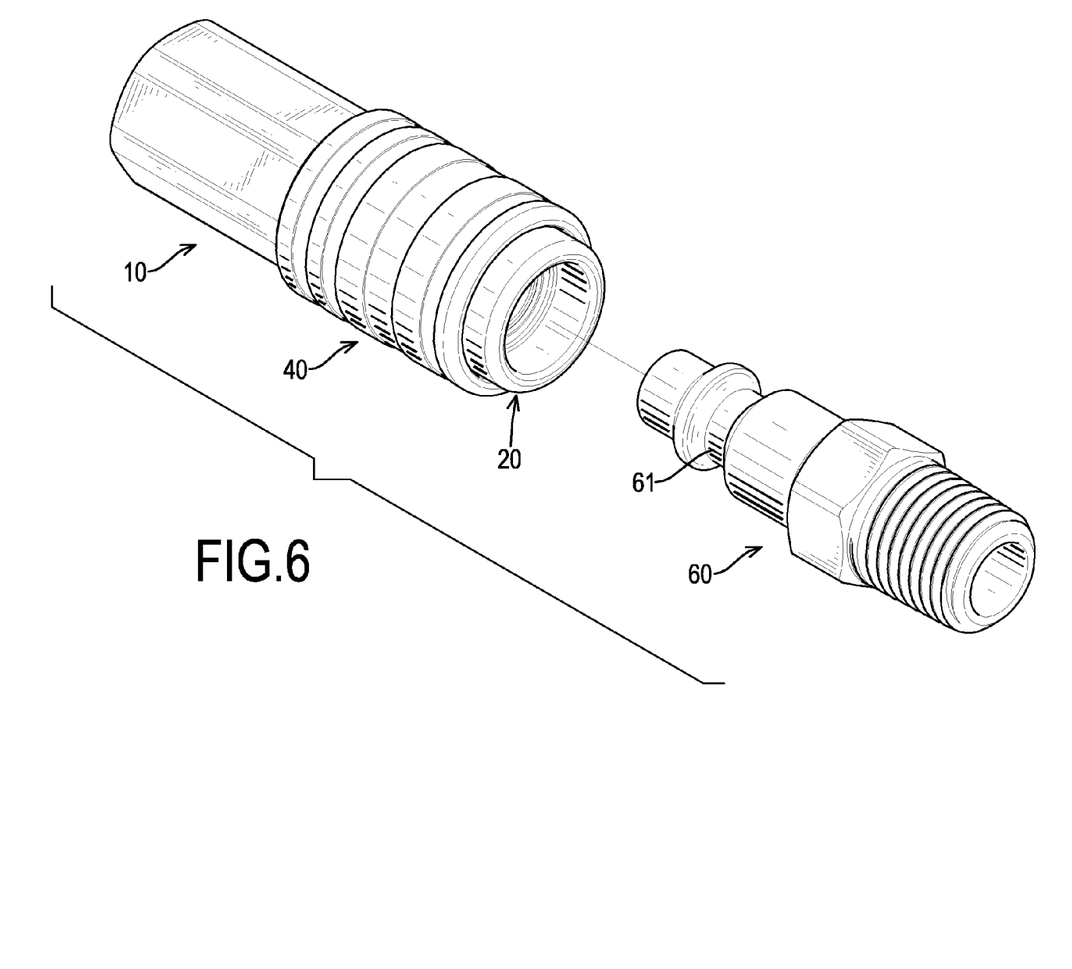
FIG. 6 is an operational exploded perspective view of the quick release connector in FIG. 1 showing a plug being inserted into the connector.

The positioning mount 20 is detachably connected to the body 10 and has an external surface, an internal surface, a fixing end 21, an inserting end 22, an air outlet chamber 23, a returning spring 24, multiple ball holes 25, multiple balls 26 and multiple releasing holes 27. The fixing end 21 of the positioning mount 20 is inserted into the connecting end 12 of the body 10, is securely mounted in the threaded segment 15 of the body 10 to connect the positioning mount 20 with the body 10 and abuts against the pressing ring 17 to hold the sealing ring 16 securely mounting in the mounting recess 14 of the body 10. With further reference to FIG. 6, the inserting end 22 of the positioning mount 20 is formed with the fixing end 21 and is connected to a plug 60. The air outlet chamber 23 is formed in the positioning mount 20 and communicates with the mounting recess 14 and the air inlet chamber 13 of the body 10.

The returning spring 24 is mounted in the air outlet chamber 23 of the positioning mount 20, abuts the pressing ring 17 and has two ends. One of the ends of the returning spring 24 abuts the pressing ring 17. The ball holes 25 are formed through the external surface of the positioning mount 20 at intervals near the inserting end 22 of the positioning mount 20. The ball holes 25 are arranged in a circle around the positioning mount 20 and communicate with the air outlet chamber 23. The balls 26 are respectively held in the ball holes 25 in the positioning mount 20. The releasing holes 27 are formed through the external surface of the positioning mount 20 at intervals between the fixing end 21 and the ball holes 25 and communicate with the air outlet chamber 23.

Figure 5:
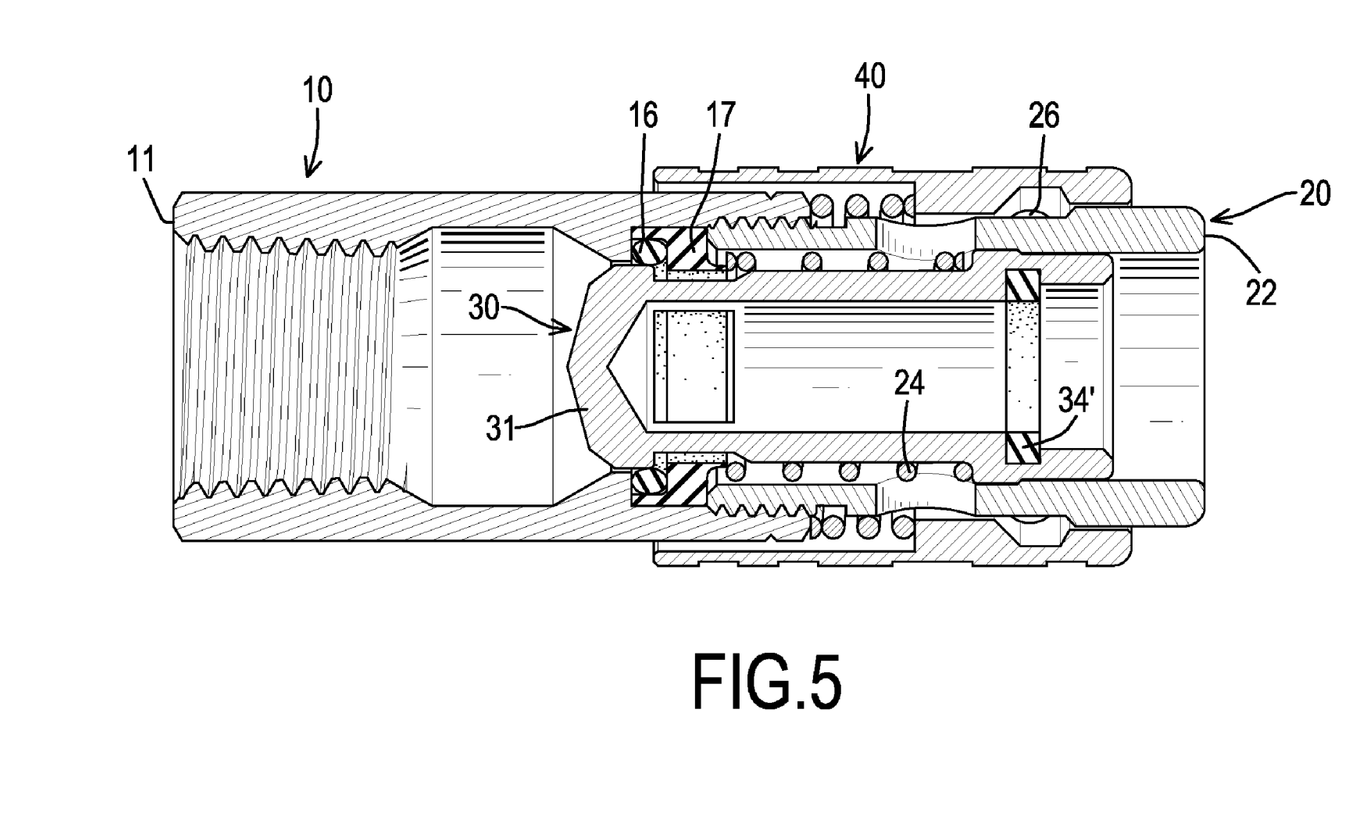
FIG. 5 is a cross sectional side view of a second embodiment of a quick release connector in accordance with the present invention.

With further reference to FIG. 5, the sealing valve 30 is movably mounted in the body 10 and the positioning mount 20, selectively abuts the sealing ring 16 of the body 10 and has an external surface, a closed end 31, an open end 32, at lease one air inlet 33, a mounting ring 34, 34' and a holding ring 35. The closed end 31 of the sealing valve 30 is enlarged and is mounted in the air inlet chamber 13 of the body 10 and mounted through the sealing ring 16 and the pressing ring 17 to selectively close a passage between the air inlet chamber 13 and the mounting recess 14 of the body 10. The open end 32 of the sealing valve 30 is mounted in the air outlet chamber 23 of the positioning mount 20 and communicates with the air outlet chamber 23. The external surface of the sealing valve 30 abuts the balls 26 at the open end 32. The returning spring 24 is mounted around the sealing valve 30 and the other end of the returning spring 24 abuts the external surface of the sealing valve 30 near the open end 32.

The at least one air inlet 33 is formed radially through the external surface of the sealing valve 30 near the closed end 31 and selectively communicates with the air inlet chamber 13 of the body 10 or the air outlet chamber 23 of the positioning mount 20. The mounting ring 34 is mounted around the open end 32 of the sealing valve 30 and abuts the internal surface of the positioning mount 20. Alternatively, with reference to FIG. 5, the mounting ring 34' is mounted in the sealing valve 30 near the open end 32 to enable the sealing valve 30 to abut closely to the plug 60. The holding ring 35 is securely mounted around the mounting ring 34 to prevent the sealing valve 30 from escaping from the positioning mount 20 via the inserting end 22 of the positioning mount 20.

The outer sleeve 40 is slidably mounted around the body 10 and the positioning mount 20 and has a mounting end, a pushing end, an internal surface, a spring recess 41, a holding recess 42 and a pressing spring 43. The mounting end of the outer sleeve 40 is mounted around the body 10 near the connecting end 12. The pushing end of the outer sleeve 40 is mounted around the positioning mount 20 near the inserting end 22. The spring recess 41 is formed in the internal surface of the outer sleeve 40 at the mounting end and is mounted around the body 10 and the positioning mount 20.

The holding recess 42 is formed in the internal surface of the outer sleeve 40 at the pushing end and holds the balls 26 of the positioning mount 20 inside to keep the outer sleeve 40 from escaping from the positioning mount 20. The pressing spring 43 is mounted around the positioning mount 20 in the spring recess 41 and abuts the connecting end 12 of the body 10 to make the balls 26 hold between the holding recess 42, the ball holes 25 and the external surface of the sealing valve 30 at the open end 32.

Figure 4:
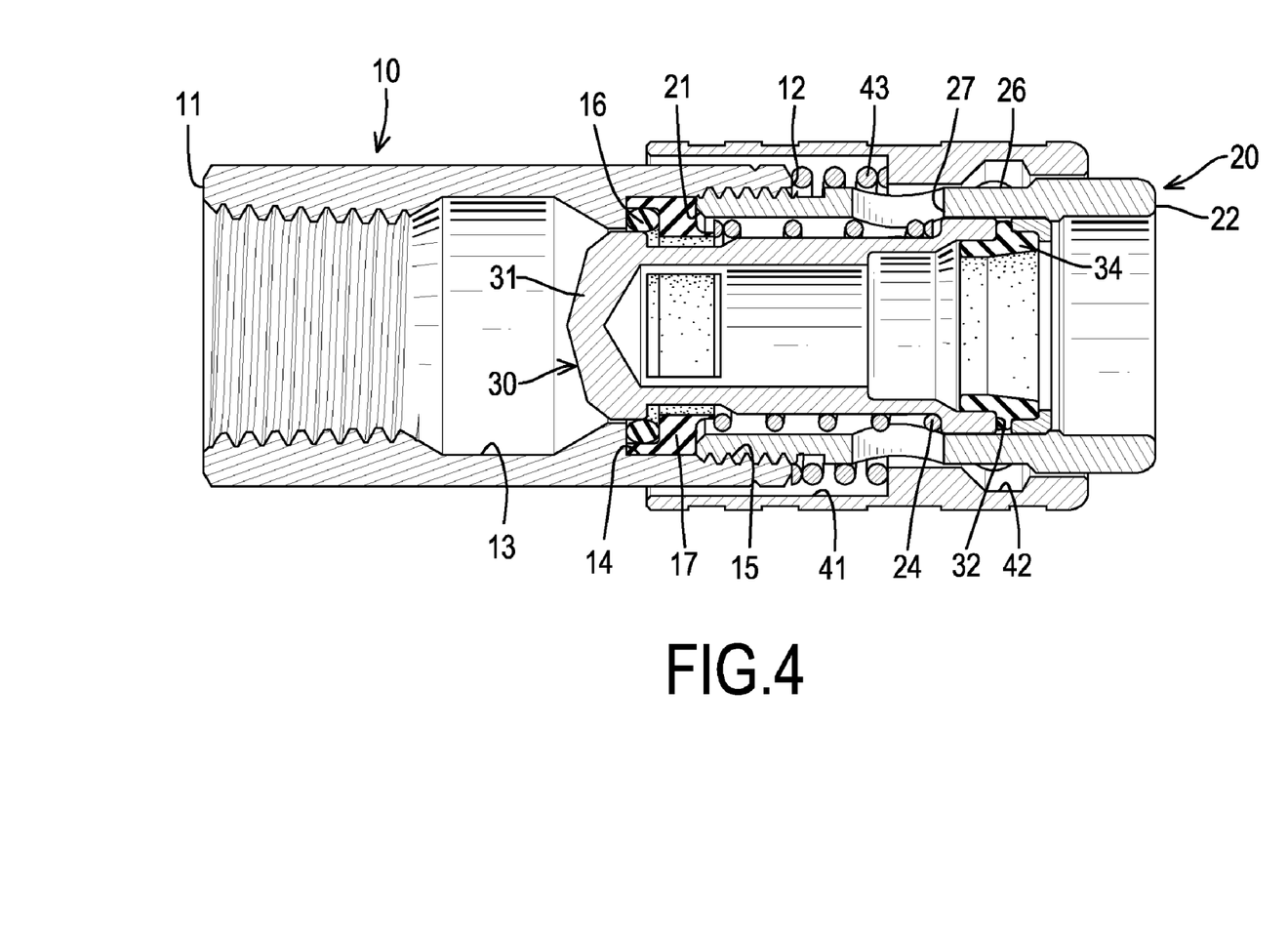
FIG. 4 is another cross sectional side view of the quick release connector in FIG. 1.

With reference to FIGS. 3 and 4, when the threaded end 11 of the body 10 is connected to an air compressor and the quick release connector as described is not connected with a plug, the closed end 21 of the sealing valve 20 abuts against the sealing ring 13 to close the passage between the air inlet chamber 112 and the mounting recess 113 of the body 10 by a force of the returning spring 12 and the pressure of the pressured air. The pressured air from the air compressor through the air inlet chamber 13 of the body 10 is blocked by the closed end 31 of the sealing valve 30 and the sealing ring 16 of the body 10 and is kept from leaking.

Figure 7:
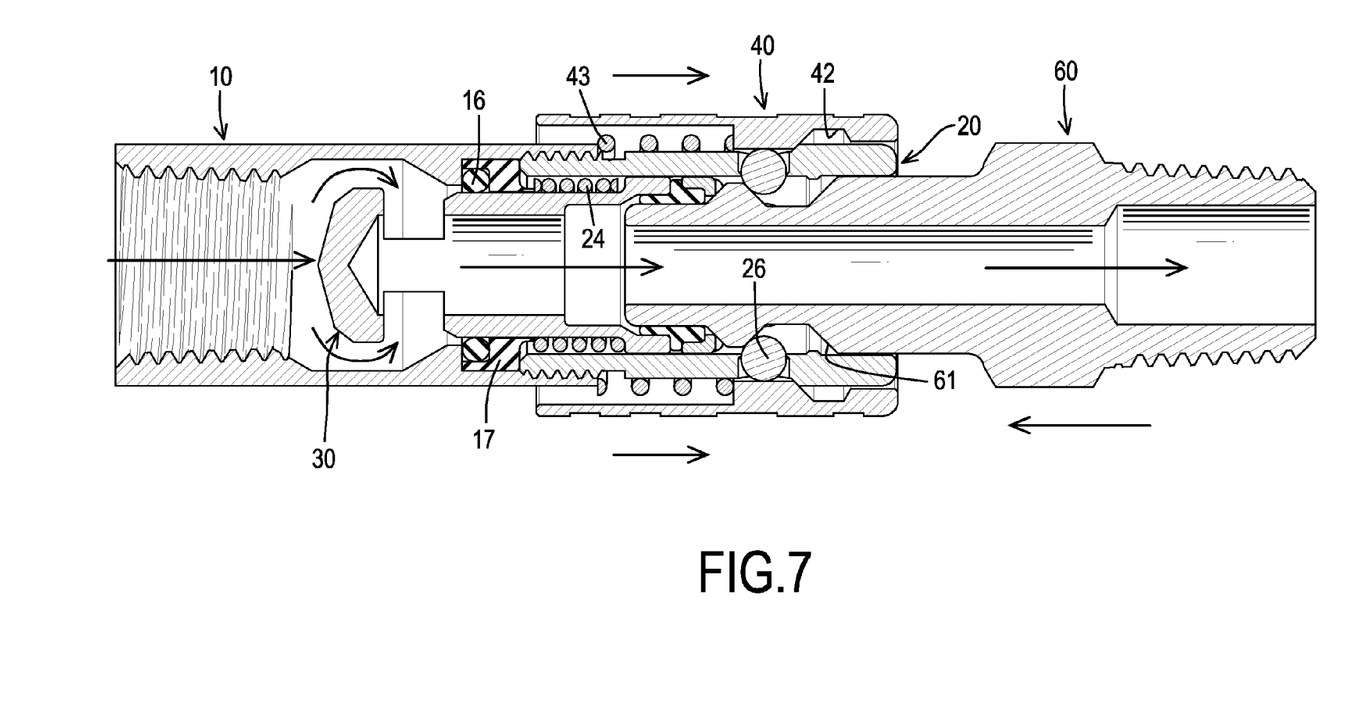
FIG. 7 is an operational cross sectional side view of the quick release connector in FIG. 5 showing the plug being inserted into the connector.

With reference to FIGS. 6 and 7, when a plug 60 with an annular engaging recess 61 connected to a tool is inserted into the sealing valve 30 by one-hand via the inserting end 22 and the air outlet chamber 23 of the positioning mount 20 to push the mounting ring 34, 34' to enable the sealing valve 30 to move to the threaded end 11 of the body 10. When the annular engaging recess 61 of the plug 60 moves inward to align with the ball holes 25 of the positioning mount 20, the balls 26 will escape from the holding recess 42 of the outer sleeve 40 and move into the annular engaging recess 61 of the plug 60. When the balls 26 move to the annular engaging recess 61 of the plug 60, the pressing spring 43 will push the outer sleeve 40 to move toward the inserting end 22 of the positioning mount 20 to enable the balls 26 to engage the annular engaging recess 61 of the plug 60 firmly between the ball holes 25 and the internal surface of the outer sleeve 40. Then, the closed end 31 of the sealing valve 30 leaves away from the sealing ring 13 to allow the at least one air inlet 33 of the sealing valve 30 to communicate with the air inlet chamber 13 of the body 10 and this can enable the pressured air to flow into the plug 60 via the at least one air inlet 33. Thus, the pressured air will flow into the tool that is connected with the plug 60 via the body 10, the sealing valve 30 and the plug 60.

Figure 8:
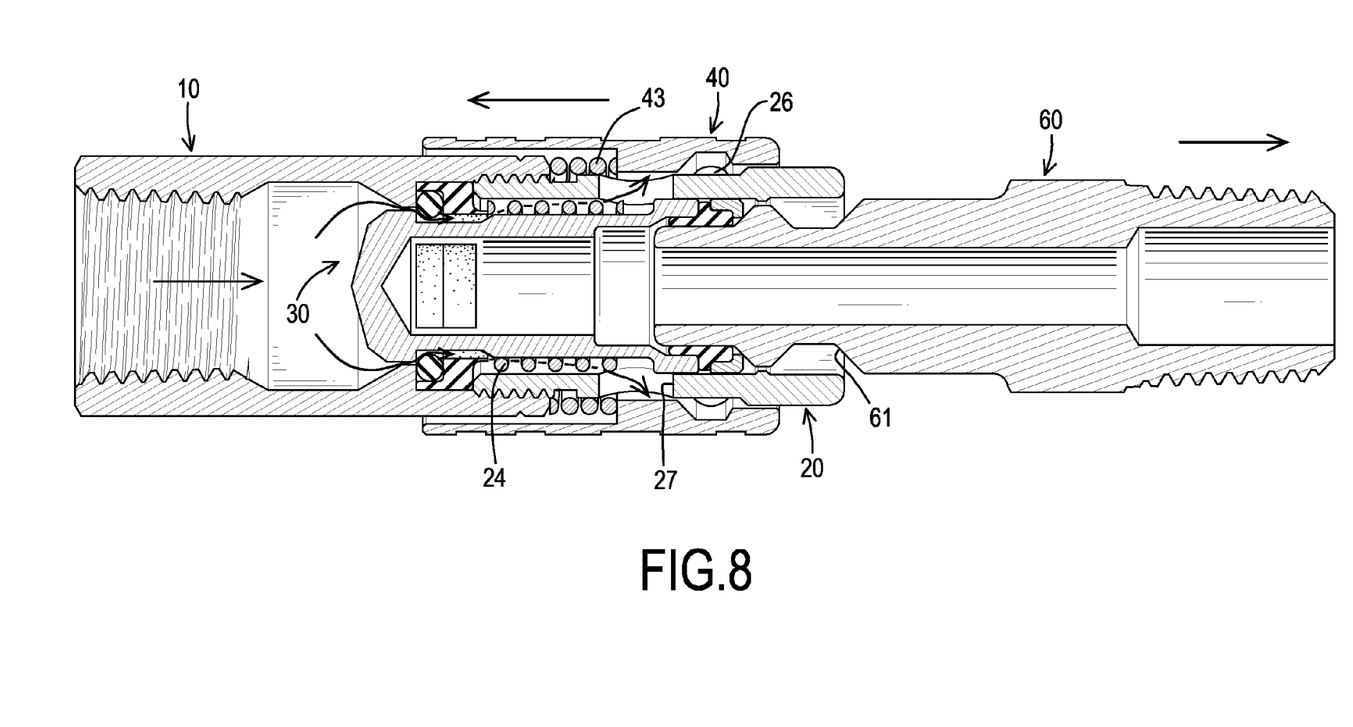
FIG. 8 is an operational cross sectional side view of the quick release connector in FIG. 5 showing the plug being separated from the connector and the connector being unsealed.

With reference to FIG. 8, to separate the plug 60 from the positioning mount 20 of the quick release connector in accordance with the present invention, the outer sleeve 40 is pushed to move forward to the threaded end 11 of the body 10 so that the balls 26 is pushed by an external surface of the plug 60 beside the annular engaging recess 61 to escape from the annular engaging recess 61 of the plug 60 and move into the holding recess 42. Thus, the plug 60 can be separated from the inserting end 22 of the positioning mount 20 easily. When the plug 60 is separated from the positioning mount 20, the sealing valve 30 moves back to the original position by the force of the returning spring 24 to make the closed end 31 of the sealing valve 30 abut with the sealing ring 16.

Figure 9B:
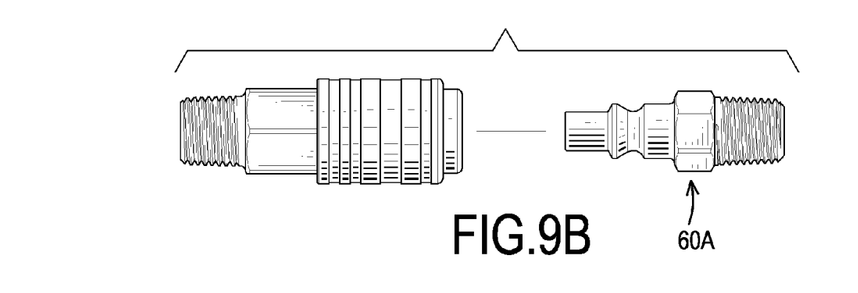
FIGS. 9B and 9C are operational side views of a quick release connector in accordance with the present invention showing different types of plugs being inserted into the connectors.
Figure 9C:
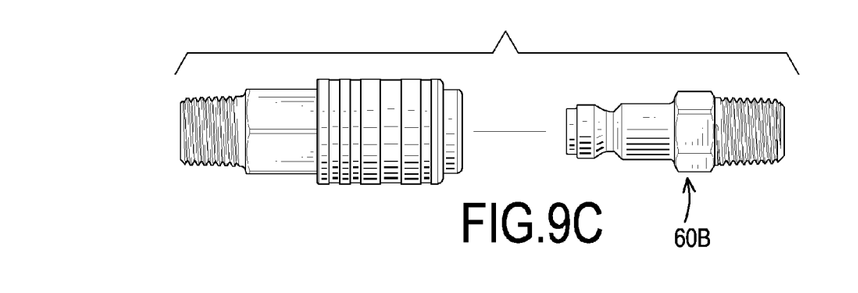

When the plug 60 is separated from the positioning mount 20, before the sealing valve 20 moves back to the original position, some of the pressured air can flow out of the positioning mount 20 via the releasing holes 27 without flowing into the plug 60. Thus, the plug 60 will not be pushed to shoot out of the positioning mount 20 by the impulsive force of the pressured air and this can prevent the plug 60 from hurting people. In addition, with reference to FIGS. 9B and 9C, different kinds of the plugs 60A (DE standards A-type), 60B (US standards T-type) can be held firmly with the positioning mount 20 by the balls 26.

The body 10 and the positioning mount 20 are manufactured to connect with each other to hold the sealing ring 16 and the pressing ring 17 securely in the mounting recess 14 by the pressing forces of the fixing end 21 of the positioning mount 20 and the returning spring 24. Then, the sealing valve 16 and the pressing ring 17 can provide a preferred sealing effect to the quick release connector without using the holding pin and this can reduce the cost and time of manufacturing and assembling the quick release connector in accordance with the present invention.

In addition, the holding recess 42 of the outer sleeve 40 can hold the balls 26 firmly with a sufficient structural strength and can prevent the balls 26 from escaping out of the outer sleeve 40 when the quick release connector falls downward from a high location. Furthermore, when the plug 60, 60A, 60B is separated from the positioning mount 20, the pressured air can flow out of the positioning mount 20 by the releasing holes 27 without flowing into the plug 60, 60A, 60B and this can prevent the plug 60, 60A, 60B from hurting people.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick release connector comprising:
   a body being hollow and having
      an external surface;
      an internal surface;
      a threaded end;
      a connecting end formed with the threaded end of the body;
      an air inlet chamber formed in the body near the threaded end and having a diameter;
      a mounting recess formed in the body, communicating with the air inlet chamber and having
         an internal surface;
         a protruding face formed on the internal surface of body at the mounting recess near the air inlet chamber; and
         a diameter smaller than the diameter of the air inlet chamber;
      a threaded segment formed in the body near the connecting end and communicating with the mounting recess and the air inlet chamber;
      a sealing ring mounted in the mounting recess of the body and abutting against the protruding face of the mounting recess; and
      a pressing ring mounted in the mounting recess and abutting the sealing ring;
   a positioning mount detachably connected to the body and having
      an external surface;
      an internal surface;
      a fixing end inserted into the connecting end of the body, securely mounted in the threaded segment of the body to connect the positioning mount with the body and abutting against the pressing ring to hold the sealing ring securely mounting in the mounting recess of the body;
      an inserting end formed with the fixing end;
      an air outlet chamber formed in the positioning mount and communicating with the mounting recess and the air inlet chamber of the body;
      a returning spring mounted in the air outlet chamber of the positioning mount, abutting the pressing ring and having two ends, one of the ends of the returning spring abutting the pressing ring;
      multiple ball holes formed through the external surface of the positioning mount at intervals near the inserting end of the positioning mount, arranged in a circle around the positioning mount and communicating with the air outlet chamber; and
      multiple balls respectively held in the ball holes in the positioning mount;
   a sealing valve movably mounted between the body and the positioning mount, selectively abutting the sealing ring of the body and having
      a closed end being enlarged and mounted in the air inlet chamber of the body and mounted through the sealing ring and the pressing ring to selectively close a passage between the air inlet chamber and the mounting recess of the body;
      an open end mounted in the air outlet chamber of the positioning mount and communicating with the air outlet chamber; and
      an external surface abutting the balls at the open end and the other end of the returning spring abutting the external surface of the sealing valve near the open end;
      at lease one air inlet formed radially through the external surface of the sealing valve near the closed end and selectively communicating with the air inlet chamber of the body or the air outlet chamber of the positioning mount; and
   an outer sleeve slidably mounted between the body and the positioning mount and having
      a mounting end mounted around the body near the connecting end;
      a pushing end mounted around the positioning mount near the inserting end;

an internal surface;

a spring recess formed in the internal surface of the outer sleeve at the mounting end and mounted around the body and the positioning mount;

a holding recess formed in the internal surface of the outer sleeve at the pushing end to hold the balls of the positioning mount inside; and a pressing spring mounted around the positioning mount in the spring recess and abutting the connecting end of the body to make the balls hold between the holding recess, the ball holes and the external surface of the sealing valve at the open end.

2. The quick release connector as claimed in claim 1, wherein the positioning mount has multiple releasing holes formed through the external surface of the positioning mount at intervals between the fixing end and the ball holes and communicating with the air outlet chamber.

3. The quick release connector as claimed in claim 2, wherein the sealing valve has a mounting ring mounted around the open end of the sealing valve and abutting the internal surface of the positioning mount; and a holding ring securely mounted around the mounting ring to prevent the sealing valve from escaping from the positioning mount via the inserting end of the positioning mount.

4. The quick release connector as claimed in claim 3, wherein the threaded end of the body has a thread formed in the internal surface of the body near the threaded end.

5. The quick release connector as claimed in claim 3, wherein the threaded end of the body has a thread formed on the external surface of the body near the threaded end.

6. The quick release connector as claimed in claim 2, wherein the threaded end of the body has a thread formed in the internal surface of the body near the threaded end.

7. The quick release connector as claimed in claim 2, wherein the threaded end of the body has a thread formed on the external surface of the body near the threaded end.

8. The quick release connector as claimed in claim 1, wherein the sealing valve has a mounting ring mounted around the open end of the sealing valve and abutting the internal surface of the positioning mount; and a holding ring securely mounted around the mounting ring to prevent the sealing valve from escaping from the positioning mount via the inserting end of the positioning mount.

9. The quick release connector as claimed in claim 1, wherein the threaded end of the body has a thread formed in the internal surface of the body near the threaded end.

10. The quick release connector as claimed in claim 1, wherein the threaded end of the body has a thread formed on the external surface of the body near the threaded end.

* * * * *